(12) United States Patent
Winkler

(10) Patent No.: US 6,359,417 B1
(45) Date of Patent: Mar. 19, 2002

(54) RECHARGEABLE BATTERY PACK FOR A MOBILE TERMINAL WITH UNIQUE IDENTIFICATION AND TIME REFERENCE

(75) Inventor: Gregor Winkler, Zorneding (DE)

(73) Assignee: Sony International (Europe) GmbH, Berlin (DE)

(*) Notice: Subject to any disclaimer, the term of this patent is extended or adjusted under 35 U.S.C. 154(b) by 0 days.

(21) Appl. No.: 09/692,407

(22) Filed: Oct. 19, 2000

(30) Foreign Application Priority Data

Oct. 20, 1999 (EP) .......................................... 99 120 779

(51) Int. Cl.⁷ ............................................. H01M 10/46
(52) U.S. Cl. ...................................................... 320/106
(58) Field of Search .................................. 320/106, 110, 320/113, 137

(56) References Cited

U.S. PATENT DOCUMENTS

| | | | |
|---|---|---|---|
| 5,608,306 A | * | 3/1997 | Rybeck et al. |
| 5,754,029 A | * | 5/1998 | Mann et al. |
| 5,850,134 A | * | 12/1998 | Oh et al. |
| 6,208,147 B1 | * | 3/2001 | Yoon et al. |

FOREIGN PATENT DOCUMENTS

| | | |
|---|---|---|
| EP | 0 616 281 | 9/1994 |
| EP | 0 673 103 | 9/1995 |
| WO | WO 90 13983 | 11/1990 |
| WO | WO 99 16142 | 4/1999 |

* cited by examiner

*Primary Examiner*—Edward H. Tso
(74) *Attorney, Agent, or Firm*—Frommer Lawrence & Haug LLP; William S. Frommer

(57) ABSTRACT

The present invention relates to a rechargeable battery pack (1) for a mobile terminal (10) of a wireless telecommunication system, with one or more battery cells (2), time reference means (3, 4) for generating relative time reference information (cv), identification means (5) for providing unique identification information (ID) allocated to the battery pack (1), and interface means (6) for transmitting said unique identification information (ID) and said relative time reference information (cv) to a connected mobile terminal (10) for updating real time information in the mobile terminal (10) on the basis of said unique identification information (ID) and said relative time reference information (cv). Further, the present invention relates to a mobile terminal (10) for a wireless telecommunication system, with interface means (11) for receiving unique identification information from a rechargeable battery pack (1) connected to said mobile terminal (10), real time means (14, 15) for generating real time information for the mobile terminal (10) and control means (12) for determining on the basis of received unique identification information (ID) if a connected battery pack (1) has been connected before and for updating said real time information on the basis of accurate time information (tm) depending on said determination result.

14 Claims, 2 Drawing Sheets

$tm = tn\_ID + (cv - cn\_ID) * 1/fn$

Figure 1:
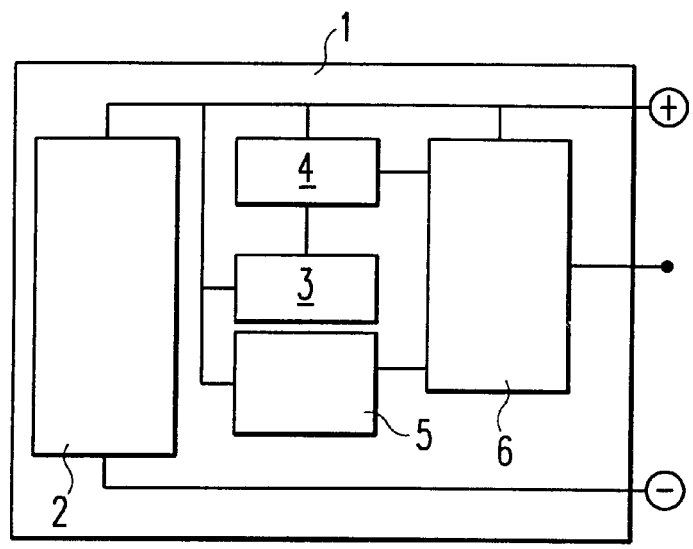

RECHARGEABLE BATTERY PACK FOR A MOBILE TERMINAL WITH UNIQUE IDENTIFICATION AND TIME REFERENCE

The present invention relates to a rechargeable battery pack for a mobile terminal of a wireless telecommunication system, a mobile terminal for a wireless telecommunication system and a method for providing accurate real time information in a mobile terminal for a wireless telecommunication system.

Usual mobile terminals of wireless telecommunication systems, as e. g. the GSM system, comprise real time means generating and providing real time information for the mobile terminal. Such a real time means e. g. comprises a quartz device operating in the kHz frequency range and represents a cheap and little energy-consuming possibility of generating real time information for use in the mobile terminal. Such a mobile terminal further comprises a rechargeable battery pack which can be connected and deconnected from the mobile terminal so that, when a first rechargeable battery pack is empty, a user can replace this first rechargeable battery pack with a second rechargeable battery pack being fully charged. The first rechargeable battery pack can then be recharged while the mobile terminal is operated with the second rechargeable battery pack. In this way, a mobile terminal can be continuously used. On the other hand, in case that a rechargeable battery pack connected to a mobile terminal is empty, it has to be ensured that the real time means in the mobile terminal continues to operate. Therefore, a back-up battery is provided for the real time means of the mobile terminal in order to keep the real time information. In this way, real time information is provided in the mobile terminal even after a power fail or after a battery pack has been removed or changed.

In the prior art, different types of rechargeable battery packs are known. U.S. Pat. No. 5,248,929 proposes a battery monitoring system for a mobile terminal which provides the user with a real time display of the amount of time remaining for the use of the mobile terminal on the basis of the stored energy in the battery pack. EP 0 673 103 A1 discloses a rechargeable battery pack with an identification circuit providing the unique identification information for the battery pack and a real time clock. The battery pack can be instantly identified on the basis of the unique identification information for purposes of controlling the recharging of the battery in a respective charging apparatus. The real time clock included in the battery pack provides real time information for the mobile terminal. The mobile terminal is not provided with a real time clock means but receives the real time information from a connected battery pack.

The object of the present invention is to provide a rechargeable battery pack for a mobile terminal of a wireless telecommunication system, a mobile terminal for a wireless telecommunication system and a method for providing accurate real time information in a mobile terminal for a wireless telecommunication system, in which accurate real time information is provided in a simple, cheap and effective way.

This object is achieved by a rechargeable battery pack for a mobile terminal of a wireless telecommunication system according to claim 1, comprising one or more battery cells, time reference means for generating relative time reference information, identification means for providing unique identification information allocated to the battery pack and interface means for transmitting said unique identification information and said relative time reference information to a connected mobile terminal for updating real time information in the mobile terminal on the basis of said unique identification information.

The above object is further achieved by a mobile terminal for a wireless telecommunication system according to claim 4, comprising interface means for receiving unique identification information from a rechargeable battery pack connected to the mobile terminal, real time means for generating real time information for the mobile terminal, and control means for determining on the basis of received unique identification information if a connected battery pack has been connected before and updating said real time information on the basis of accurate time information depending on said determination result.

The above object is further achieved by a method for providing accurate real time information in a mobile terminal for a wireless telecommunication system, comprising the steps of generating real time information in the mobile terminal, receiving unique identification information from a rechargeable battery pack connected to the mobile terminal, determining on the basis of received unique identification information if a connected battery pack has been connected before, and updating the real time information on the basis of accurate time information depending on the determination result in order to obtain accurate real time information.

The present invention provides a simple, effective and cheap possibility of providing accurate real time information in a mobile terminal of a wireless telecommunication system. Particularly, the real time means in the mobile terminal according to the present invention can be implemented as a cheap and very simple real time means for generating real time information in the mobile terminal, as e. g. a software algorithm or the like. Further, no back-up means has to be provided for the real time means of the mobile terminal according to the present invention, since the real time information generated by the real time means is regularly updated when a rechargeable battery pack is connected to the mobile terminal. Therefore, there is no need in the mobile terminal according to the present invention to maintain the operation of the real time means when the battery pack is removed or changed, since every time when a charged battery pack is connected to the mobile terminal, the real time information of the real time means of the whole terminal is updated on the basis of accurate time information.

Therefore, the rechargeable battery pack and the mobile terminal according to the present invention can be produced at low cost. Further, no recycling problems of a back-up battery provided in the mobile terminal arise.

Advantageously, the rechargeable battery pack according to the present invention comprises a back-up means for backing up the time reference means when the battery pack is empty or discharged. In this case, some energy might remain in the one or more battery cells of the battery pack to provide the back-up function for the time reference means. The remaining energy, however, might not be sufficient anymore to operate the mobile terminal. In this way, the back-up function is transferred from the mobile terminal as known in the prior art to the rechargeable battery pack according to the present invention so that an extended back-up time compared to the back-up time of a normal back-up means provided in a mobile terminal as known from the prior art can be provided. For example, real time clock circuitry implemented in a complex chipset operates normally between 2.7V and 3.3V and uses 5 to 15 uA (e.g. 0.3 um process), due to other requirements of the chip-set (e.g. speed integration of different memory types, . . . ). The capacity of a standard back-up battery is in the range of 2 mAh to 4 mAh. In addition, a charging circuitry is required which needs an additional 50–100 uA quiescent current.

On the other hand an optimised simple real time clock circuitry can operate between 1V to 5V and uses normally less than 1 uA. Due to the superior voltage condition it can be operated directly from the battery pack and does not require a charging circuitry. Furthermore, a battery pack when discharged so that the phone itself is not operational any more has normally a remaining capacity above 10 mAh.

This gives an increase of the back-up time of a factor of 120 to 2500.

The above values are examples of the today's technology. Specific values can vary dependent on the process.

If necessary, however, the mobile terminal can comprise a back-up battery connected to the real time means. The back-up battery is charged by the battery pack of the mobile terminal during operation and enables the real time means to output real time information even when the battery pack is disconnected from the mobile terminal or empty.

Advantageously, the time reference means of the rechargeable battery pack of the present invention comprises a frequency base providing a frequency signal and a counter means for converting said frequency signal into counts representing the relative time reference information.

A major advantage of the relative time reference is, that battery packs can be swaped between different users/different mobile terminals. Both users can modify the time setting without influencing the other user's setting, since the counts in the battery pack are not modified, only the information stored in the mobile telephone.

Thereby, the frequency base may provide a very precise high frequency signal, e. g. in the MHz frequency range, so that a very accurate real time information can be obtained in a connected mobile terminal. On the other hand, the frequency base can e. g. comprise a normal quartz device providing a low frequency signal in the kHz frequency range so that a more cost-effective solution can be achieved.

As stated above, the mobile terminal according to the present invention comprises control means for determining on the basis of received unique identification information if a connected battery pack, as e. g. a battery pack according to the present invention as described above, has been connected before and for updating said real time information generated from the real time means of the mobile terminal on the basis of accurate time information depending on the determination result. Advantageously, the control means thereby updates the real time information on the basis of accurate time information input via an input means in case that a connected battery pack has never been connected before and stores said accurate time information, a relative time information received from the connected battery pack and corresponding to the time point of said accurate time information and said unique identification information in a memory means. Thus, in case that a connected battery pack is connected for the first time with the mobile terminal, which is determined on the basis of the unique identification information, the control means requests the input of an accurate time information from a user. Upon the input of said accurate time information, the control means reads the relative time reference information from the connected battery pack at the timepoint of the accurate time information and then stores the accurate time information, the relative time reference information and the unique identification information linked together in said memory means.

In this case, the control means advantageously, upon determining that a connected battery pack has been connected before, updates the real time information provided in the mobile terminal on the basis of an actual relative time reference information received from the connected battery pack as well as accurate time information and relative reference time information stored together with the unique identification information of the connected battery pack in the memory means. Thus, when a connected battery pack is connected once again with the mobile terminal which is detected by the control means by comparing the unique identification information received from the connected battery pack with the information stored in the memory means, the control means reads the accurate time information and relative reference time information stored together with the unique identification information from the memory means so that the real time information from the real time means can be updated and accurate real time information is provided in the mobile terminal.

Advantageously, the memory means of the mobile terminal is a non-volatile memory so that information stored in the memory means is maintained even when the battery pack is exchanged or empty. Further advantageously, the memory means of the mobile terminal stores accurate time information, relative time reference information corresponding to the accurate time information and unique identification information for a predetermined number of different battery packs, whereby for each battery pack the connecting timepoint is additionally stored to enable an overwriting in case that the memory means is full. The connecting timepoint is a timepoint at which the battery pack is connected to the mobile terminal. In this way, information relating to the battery pack which has been connected the longest time ago can be erased or overwritten to enable new information relating to a newly connected battery pack can be stored in the memory means.

In addition, correction values and/or the timezone of the accurate time information can be advantageously stored for each battery pack in said memory means of the mobile terminal.

Figure 2:
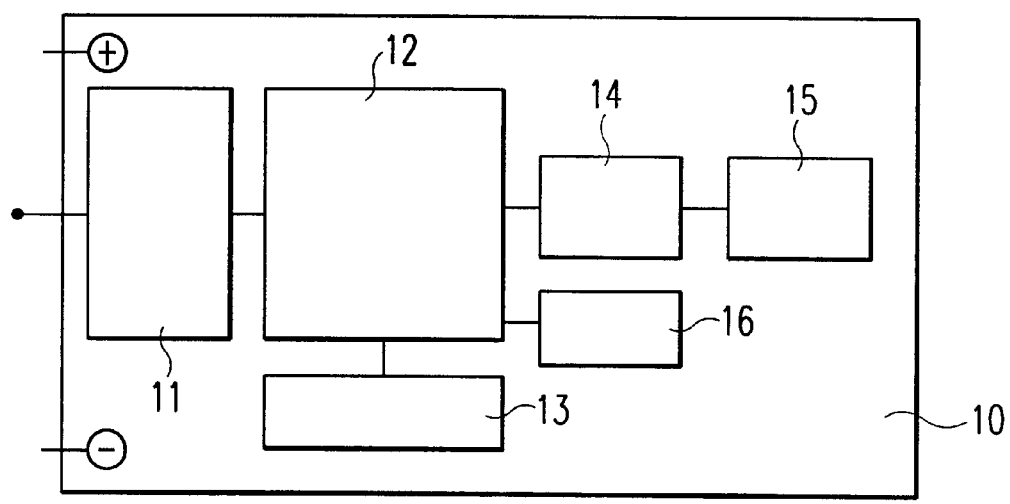
Figure 3:
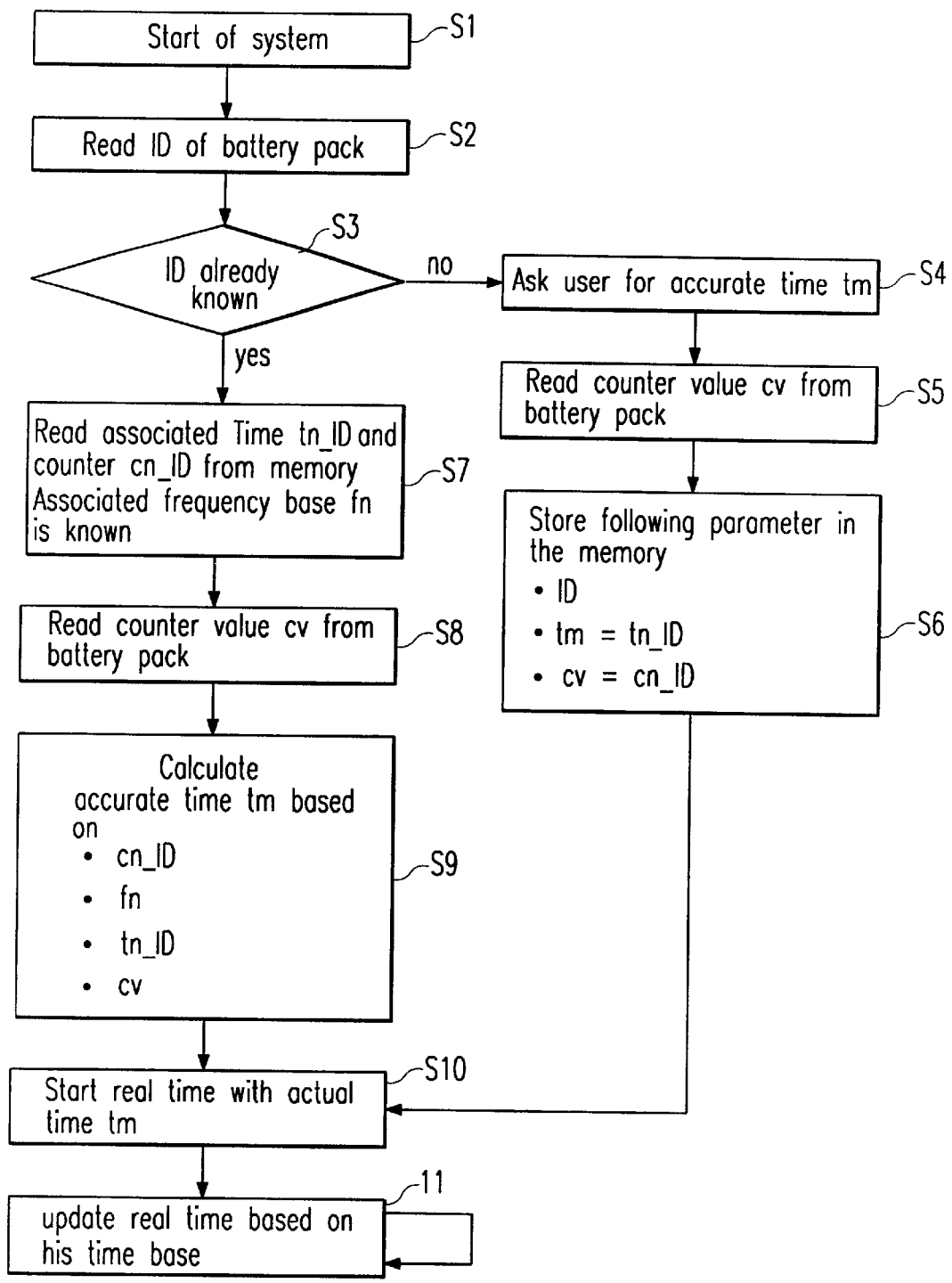

In the following description, the present invention is explained in more detail in relation to the enclosed drawings, in which FIG. 1 shows a schematic diagram of a rechargeable battery pack according to the present invention, FIG. 2 shows a schematic diagram of a mobile terminal according to the present invention, and FIG. 3 shows a flow chart explaining the method for providing accurate real time information in a mobile terminal according to the present invention.

FIG. 1 shows a schematic block diagram of a rechargeable battery pack 1 according to the present invention. The rechargeable battery pack 1 comprises one or more battery cells 2, time reference means 3, 4 for generating a relative time reference information and identification means 5 for providing unique identification information allocated to the battery pack 1. The time reference means comprises a frequency base 3 for generating frequency signals and a counter 4 for counting the high frequency signals output from the frequency base 3, i. e. converting the frequency signals into counts representing a relative time reference information. Depending on the required application and depending on the required cost frame, the frequency base 3 can either be a very precise high frequency base providing frequency signals in the MHz frequency range or a less accurate low frequency base generating lower frequency signals in the kHz frequency range. In the later case, the frequency base 3 may e. g. comprise a quartz device or the like.

The identification means 5 is e. g. a memory means in which the respective unique identification information allocated to the battery pack 1 is stored.

The rechargeable battery pack 1 further comprises connection terminals for connecting the one or more battery cells 2 to a mobile terminal of a wireless telecommunication system, as e. g. the mobile terminal 10 shown in FIG. 2. Further, the rechargeable battery pack 1 comprises interface means 6 for transmitting the unique identification information from the identification means 5 and the relative time reference information from the time reference means 3, 4 to a connected mobile terminal. The interface means 6 e. g. comprises electrical connection terminals for electrically connecting the identification means 5 and the time reference means 3, 4 to a mobile terminal. Further, the battery pack 1 comprises connection means for mechanically connecting the battery pack 1 to a mobile terminal.

The relative time reference information generated by the time reference means 3, 4, consists of, in the example shown in FIG. 1, counts or a count number of the frequency signal generated in the frequency base 3. Therefore, the time reference means 3, 4 does not provide absolute time information or real time information representing the present timepoint, but only relative time information representing the current or present state of the counter 4. Therefore, the time reference means 3, 4 can be implemented in a simple and cost-effective way in the rechargeable battery pack 1 according to the present invention. As explained below in relation to FIG. 2, the unique identification information and the relative time reference information are used for updating real time information in a connected mobile terminal in order to obtain accurate real time information.

FIG. 2 shows a schematic block diagram of a mobile terminal 10 according to the present invention. The mobile terminal 10 comprises connecting means for mechanically connecting a rechargeable battery pack, as e. g. the rechargeable battery pack 1 shown in FIG. 1, to supply the mobile terminal 10 with power. The mobile terminal 10 further comprises interface means 11 for electrically connecting corresponding connection terminals of the rechargeable battery pack to a control means 12 of the mobile terminal 10. The interface means 6 is thereby adapted for receiving unique identification information as well as relative time reference information from a connected rechargeable battery pack connected to the mobile terminal 10. Further, the mobile terminal 10 comprises real time means 14, 15 for generating and providing real time information for the mobile terminal 10. The real time means comprises a frequency base 15 generating frequency signals and a counter means 14 for converting the frequency signals from the frequency base 15 into counts. The counts are supplied from the counter 14 to the control means 12 which transforms the counts into a real or absolute time information indicating the present occurrent timepoint.

The control means 12 thereby determines, upon connecting a rechargeable battery pack to the mobile terminal 10, on the basis of received unique identification information uniquely identifying the connected battery pack if the battery pack has been connected before and updates the real time information generated on the basis of the counts from the counter 14 depending on the determination result.

In case that a rechargeable battery pack, as e. g. the battery pack 1 shown in FIG. 1, is connected for the first time to the mobile terminal 10 according to the present invention, the control means 12 of the mobile terminal 10 receiving the unique identification information from the connected battery pack compares the received unique identification information with unique identification information previously stored and determines that the presently connected battery pack has never been connected before, since the respective unique identification information is not stored yet. Then, the control means 12 requests the input of accurate time information, e. g. via a display of the mobile terminal 10, from a user. When the requested accurate time information is input via an input means 16, such as a usual key pad of the mobile terminal 10, the control means 12 updates the real time information generated by means of the real time means 14, 15, so that accurate real time information is obtained. This accurate real time information is then e. g. displayed on the display of the mobile terminal 10 or used for other functions in the mobile terminal 10. At the same time, the control means 12 stores the input accurate time information together with relative time reference information received from the connected battery pack and the unique identification information of the connected battery pack in a memory means 13. The relative time reference information stored together with the accurate time information thereby represents the current relative time reference information at the timepoint of the accurate time information input via the input means 16. In case that the battery pack 1 as shown in FIG. 1 connected to the mobile terminal 10, the relative time reference information is the current state of the counter 4. In the memory means 13, correction values and/or timezone information of the accurate time information may additionally be stored for the connected battery pack.

In case that the rechargeable battery pack connected to the mobile terminal 10 had been connected before, the corresponding unique identification information together with the accurate time information input at that timepoint as well as the relative time reference information corresponding to said timepoint are already stored in the memory means 13. The control means 12 receiving a unique identification information from a battery pack, which had been connected before, therefore detects the same unique identification information stored in the memory means 13 and reads the accurate time information and the relative time reference information stored together with the unique identification information from the memory means 13. Since the accurate time information read from the memory means 13 is an accurate and precise time information and a relative time reference information stored in the memory means 13 is the corresponding relative time reference information which was read from the same battery pack, the control means 12 now reads the current real time reference information from the time reference means of the connected battery pack, as e. g. the time reference means 3, 4 of the battery pack 1 as shown in FIG. 1, in order to be able to update the real time information provided by the real time means of the mobile terminal 10. The exact procedure for updating the real time information of the mobile terminal 10 is explained in detail in relation to FIG. 3.

The memory means 13 of the mobile terminal 10 is advantageously a non-volatile memory so that the stored information is kept even if the battery pack of the mobile terminal 10 is removed or exchanged or empty. Further, the memory means 13 has a capacity to store the accurate time information, the relative time reference information and the unique identification information for a predetermined number of different battery packs, whereby for each battery pack the timepoint, at which the battery pack is connected for the first time, is additionally stored in the memory means 13. Thereby, when the memory means 13 is full and no more information can be written into it, the information relating to the battery pack which has been connected for the longest time, can be overwritten or erased.

It is to be noted that the battery pack 1 shown in FIG. 1 as well as the mobile terminal 10 shown in FIG. 10 may comprise further elements necessary for the respective operation. Since these elements are not necessary for the understanding of the present invention, they are not shown for the sake of clarity.

In FIG. 3, a flow chart for explaining the method for providing accurate real time information in a mobile terminal, as e. g. the mobile terminal 10 shown in FIG. 2 by means of a rechargeable battery pack connected to the mobile terminal, as e. g. the rechargeable battery pack shown in FIG. 1, is shown.

In the following, the flow chart shown in FIG. 3 is explained in relation to the mobile terminal 10 shown in FIG. 2 and the battery pack 1 shown in FIG. 1 as an example.

In step 1, the system is started, i. e. the rechargeable battery pack 1 is inserted or connected to the mobile terminal 10. In step S2, the control means 12 of the mobile terminal 10 obtains the unique identification information ID from the identification means 5 of the battery pack 1 via the interface means 6 and the interface means 11. Then, the control means 12 checks in step S3, if the unique identification information ID is already known or not, i. e. if the battery pack 1 had been connected before or not. Thereby, the control means 12 compares the received unique identification information ID with already stored identification information in the memory means 13.

In case that the unique identification information ID obtained from the battery pack 1 is not stored in the memory means 13 and the battery pack 1 has never been connected to the mobile terminal 10, the control means 12 asks the user to input accurate time information tm in a step S4. For example, the control means 12 outputs a signal to the display of the mobile terminal 10 together with an acoustic indication to indicate that the input of accurate time information is required. At the same timepoint at which the user inputs accurate time information tm, the control means 12 then reads in a step S5 the current counter value cv from the counter means 4 of the time reference means of the battery pack 1. The counter value cv thereby represents a relative time reference information. Thereafter, the control means 12 stores the received unique identification information ID, the accurate time information tm and the counter value cv at the timepoint of the input accurate time information in the memory means 13. Thereby, the input accurate time information tm is stored as parameter value tn_ID allocated to the unique identification information ID and the counter value cv is stored as parameter value cn_ID allocated to the unique identification information ID. Then, the control means 12 updates the real time information generated by the real time means 14, 15 with the input accurate time information tm in a succeeding step S10. The real time means 14, 15 implemented in the mobile terminal 10 does not need a back-up battery since every time a new rechargeable battery pack is connected to the mobile terminal 10, the real time means is started or updated with accurate time information. Further, the real time means 14, 15 can be implemented in a very cheap and simple way, as e. g. by means of a software algorithm, since every time a new full battery pack is connected to the mobile terminal 10, the real time means is updated. During normal operation, the real time means 14, 15 of the mobile terminal 10 is generating and providing regularly real time information for use in the mobile terminal 10 on the basis of the power supplied by the battery pack 1, as shown in step S11 in FIG. 3.

In case that the control means 12 of the mobile terminal 10 detects in step S3, that the unique identification information ID received from the newly connected battery pack 1 is already stored in the memory means 13, i. e. that the battery pack 1 already had been connected to the mobile terminal 10, the control means 12 reads the parameter value tn_ID of the accurate time information and the parameter value cn_ID of the counter value associated with the received and known unique identification information ID from the memory means 13 in a step S7. Then, the control means 12 reads the current counter value cv from the counter means 4 of the connected battery pack 1 in a succeeding step S8. Thereafter, the control means 12 calculates in a step S9 an accurate time information tm based on the parameter values cn_ID and tn_ID stored in the memory means 13 in association with the unique identification information ID of the battery pack 1, the current counter value cv read from the connected battery pack 1 and the frequency value fn of the frequency base 3 of the battery pack 1. The frequency value fn can thereby be stored in the memory means 13 as a general value for all battery packs to be connected to the mobile terminal 10 in case that all rechargeable battery packs 1 which can be connected to the mobile terminal 10 use the same frequency for their frequency bases. In case that battery packs with different frequency bases can be connected to the mobile terminal 10, each battery pack could comprise means for providing the respective frequency value to the mobile terminal 10 so that an accurate time information tm can be readily calculated. The control means 12 calculates the accurate time information tm on the basis of the above-mentioned values read from the memory means 13 according to the following formula: $tm = tn\_ID + (cv - cn\_ID) \times 1/fn$.

Thereafter, the control means 12 updates or starts the real time means 14, 15 with the calculated accurate time information tm in step S10 as described above.

What is claimed is:

1. Rechargeable battery pack (1) for a mobile terminal of a wireless telecommunication system, with one or more battery cells (2), time reference means (3, 4) for generating relative time reference information (cv), identification means (5) for providing unique identification information (ID) allocated to the battery pack (1), and interface means (6) for transmitting said unique identification information (ID) and said relative time reference information (cv) to a connected mobile terminal for updating real time information in the mobile terminal on the basis of said unique identification information and said relative time reference information (cv).

2. Rechargeable battery pack (1) according to claim 1, characterized in, that said time reference means (3, 4) generates relative time reference information (cv) on the basis of a frequency signal.

3. Rechargeable battery pack according to claim 1, characterized in, that said time reference means comprises a frequency base (3) providing a frequency signal and a counter means (4) for converting said frequency signal into counts representing said relative time reference information (cv).

4. Mobile terminal (10) for a wireless telecommunication system, with interface means (11) for receiving unique identification information from a rechargeable battery pack (1) connected to said mobile terminal, real time means (14, 15) for generating real time information for the mobile terminal, and control means (12) for determining on the basis of received unique identification information (ID) if a connected battery pack (1) has been connected before and for updating said real time information on the basis of accurate time information (tm) depending on said determination result.

5. Mobile terminal (10) according to claim 4, characterized in, that said control means (12) updates said real time information on the basis of accurate time information (tm) input via an input means (16) in case that a connected battery pack (1) has never been connected before and stores said accurate time information, a relative time reference information received from the connected battery pack (1) and corresponding to the timepoint of said accurate time information and said unique identification information in a memory means (8).

6. Mobile terminal (10) according to claim 5, characterized in, that said control means (12), upon determining that a connected battery pack (1) has been connected before, updates said real time information on the basis of an actual relative time reference information received from said connected battery pack (1) as well as accurate time information and relative reference time information stored together with the unique identification information of the connected battery pack in said memory means (13).

7. Mobile terminal (10) according to claim 6, characterized in, that said memory means (8) is a non volatile memory.

8. Mobile terminal (10) according to claim 6, characterized in, that said memory means (13) stores accurate time information, relative time reference information corresponding to said accurate time information and unique identification information for a predetermined number of different battery packs, whereby for each battery pack the last connecting timepoint is additionally stored to enable an overwriting in case that the memory means is full.

9. Mobile terminal (10) according to claim 8, characterized in, that said memory means (13) stores correction values and/or timezone information of the accurate time information for each battery pack.

10. Method for providing accurate real time information in a mobile terminal (10) for a wireless telecommunication system, comprising the steps of generating real time information in said mobile terminal (10), receiving unique identification information from a rechargeable battery pack (1) connected to said mobile terminal (10), determining on the basis of received unique identification information (ID) if a connected battery pack (1) has been connected before, and updating said real time information on the basis of accurate time information (tm) depending on said determination result in order to obtain accurate real time information.

11. Method according to claim 10, characterized in, that said real time information is updated on the basis of accurate time information (tm) actually input to said mobile terminal (10) in case that a connected battery pack (1) has never been connected before, whereby said accurate time information (tm) and a relative time reference information (cv) corresponding to the timepoint of said accurate time information (tm) are stored together with said unique identification information (ID) in a memory means (8).

12. Method according to claim 10, characterized in, that upon determining that a connected battery pack (1) has been connected before, said real time information is updated on the basis of an actual relative time reference information received from said connected battery pack (1) as well as accurate time information and relative reference time information stored together with the unique identification information (ID) of the connected battery pack (1) in said memory means.

13. Method according to claim 10, characterized in, that in said memory means accurate time information, relative time reference information corresponding to said accurate time information and unique identification information is stored for a predetermined number of different battery packs, whereby for each battery pack the connecting timepoint is additionally stored to enable an overwriting in case that the memory means is full.

14. Method according to claim 13, characterized in, that in said memory means correction values and/or timezone information of the accurate time information is stored for each battery pack.

* * * * *